(12) United States Patent
Sharma et al.

(10) Patent No.: US 8,745,072 B2
(45) Date of Patent: Jun. 3, 2014

(54) VIRTUAL DIRECTORY SERVER CHANGELOG

(75) Inventors: Amit Sharma, San Ramon, CA (US); Jingjing Wei, Redwood City, CA (US); Vasukiammaiyar Asokkumar, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/216,057

(22) Filed: Aug. 23, 2011

(65) Prior Publication Data

US 2013/0054571 A1 Feb. 28, 2013

(51) Int. Cl.
*G06F 5/01* (2006.01)

(52) U.S. Cl.
USPC .......................................................... 707/756

(58) Field of Classification Search
USPC .......................................... 707/648, 672, 756
See application file for complete search history.

(56) References Cited

U.S. PATENT DOCUMENTS

| | | | |
|---|---|---|---|
| 6,615,223 B1 | 9/2003 | Shih et al. | |
| 6,850,928 B1 | 2/2005 | McClure et al. | |
| 7,363,327 B2 | 4/2008 | Bali et al. | |
| 7,734,585 B2 | 6/2010 | Sharma et al. | |
| 7,779,091 B2 | 8/2010 | Wilkinson et al. | |
| 2004/0254919 A1* | 12/2004 | Giuseppini | 707/3 |
| 2008/0208909 A1 | 8/2008 | Rowley | |
| 2009/0006933 A1* | 1/2009 | Gavrilov et al. | 714/819 |
| 2011/0191394 A1* | 8/2011 | Winteregg et al. | 707/822 |
| 2013/0054639 A1 | 2/2013 | Sharma et al. | |

OTHER PUBLICATIONS

Oracle Fusion Middleware Oracle Fusion Middleware Administrator's Guide for Oracle Virtual Directory 11g Release 1 (11.1.1), Feb. 2011, pp. 1-436.*
Oracle Identity Management Integration Guide 10g Release 2 (10.1.2), 2005, pp. 1-6.*
U.S. Appl. No. 13/216,072, filed Aug. 23, 2011 by Sharma et al.
Good, Gordon, "Definition of an Object Class to Hold LDAP Change Records", Internet-Draft draft-ietf-asid-changelog-01.txt, Netscape Communications Corp., Jul. 30, 1997.
Oracle Fusion Middleware. Oracle Fusion Middleware Administrator's Guide for Oracle Virtual Directory 11g Release 1 (11.1.1) El 0046-04, Apr. 2010, pp. 1-412.
U.S. Appl. No. 13/216,072, Non Final Office Action mailed on Feb. 19, 2013, pp. 1-14.

* cited by examiner

*Primary Examiner* — Albert Phillips, III
(74) *Attorney, Agent, or Firm* — Kilpatrick Townsend & Stockon LLP

(57) ABSTRACT

Techniques for providing a consolidated view of directory changes across different directory servers. In one set of embodiments, a changelog record can be received from a directory server, where the directory server is associated with a proprietary changelog format, and where the changelog record is formatted according to the proprietary changelog format. The received changelog record can then be translated into a virtualized changelog record that is formatted according to a standard changelog format, and the virtualized changelog record can be sent to a consuming client. With this virtualization capability, the client does not need to be concerned with, or even aware of, the proprietary changelog mechanisms/formats that may be used by different directory servers in a multi-server deployment.

14 Claims, 9 Drawing Sheets

VIRTUAL DIRECTORY SERVER CHANGELOG

CROSS-REFERENCES TO RELATED APPLICATIONS

The present disclosure is related to the following commonly assigned, co-pending U.S. patent application, which is incorporated herein by reference in its entirety for all purposes: application Ser. No. 13/216,072, filed concurrently with the present application, entitled "GLOBALLY UNIQUE IDENTIFICATION OF DIRECTORY SERVER CHANGELOG RECORDS."

BACKGROUND

Embodiments of the present invention relate in general to directory servers, and in particular to techniques for providing a consolidated view of directory changes across different directory servers.

In the field of computer software, a directory is a set of data records (referred to herein as directory entries), typically organized according to a hierarchical structure. Each directory entry generally includes a unique identifier, known as a distinguished name, and a set of associated attributes. For instance, a corporate user directory may comprise a hierarchical grouping of directory entries corresponding to users/employees in a corporation, where each entry includes, e.g., user name, telephone, email, and manager name attributes for a particular user.

A directory server is a software and/or hardware-based system that stores, organizes, and provides access to information in a directory. For example, a directory server may allow a client to browse, query, modify, add, and/or delete directory entries. There are a number of different directory server implementations developed by different vendors, such as Oracle Internet Directory (developed by Oracle Corporation), Active Directory (developed by Microsoft Corporation), Sun Java System Directory Server (developed by Sun Microsystems, Inc.), and the like. These various implementations generally conform to one or more versions of Lightweight Directory Access Protocol (LDAP), a standard protocol for accessing distributed directory services over IP networks.

Certain directory server implementations can keep track of changes (e.g., additions, modifications, deletions) that are made to a directory via a changelog. However, since change tracking is not formally part of the LDAP standard, each implementation generally uses a proprietary changelog mechanism and format. For instance, Oracle Internet Directory generates a separate changelog record for each change to a directory entry, and uses a unique "changenumber" attribute associated with the changelog record to identify the change. In contrast, Active Directory updates a "uSNchanged" attribute on a directory entry (rather than generating a separate changelog record object) to record a change to the entry.

These disparate approaches to change tracking can cause various problems in an enterprise deployment that includes different types of directory servers. For example, client applications that are configured to consume directory changelog information must be programmed to understand the various changelog mechanisms/formats implemented by different vendors and to handle those formats appropriately. Further, since the changelog identification scheme for each directory server implementation is self-contained, there is no way to uniquely identify changelog records across different server implementations or to provide a global changelog state for all directory servers in the deployment.

BRIEF SUMMARY

Embodiments of the present invention provide a consolidated view of directory changes across different directory servers. In one set of embodiments, a changelog record can be received from a directory server, where the directory server is associated with a proprietary changelog format, and where the changelog record is formatted according to the proprietary changelog format. The received changelog record can then be translated into a virtualized changelog record that is formatted according to a standard changelog format, and the virtualized changelog record can be sent to a consuming client. With this virtualization capability, the client does not need to be concerned with, or even aware of, the proprietary changelog mechanisms/formats that may be used by different directory servers in a multi-server deployment. Rather, the client need only recognize a single, standard changelog format.

In a further set of embodiments, a "changelog cookie" can be generated for a virtualized changelog record prior to sending the record to a client. In various embodiments, the changelog cookie can act as a globally unique identifier—i.e., an identifier that distinguishes the virtualized changelog record from other virtualized changelog records (and thus, uniquely identifies the record across all directory servers in a deployment). With such a cookie, a client can easily determine the directory server that a given virtualized changelog record originated from. In certain embodiments, changelog cookies can also be used to determine the latest, global changelog state of all directory servers in a deployment and to query for any incremental changes that have occurred since that global changelog state.

According to one embodiment of the present invention, a method is provided that comprises receiving, by a computer system, a plurality of changelog records from a plurality of directory servers, where each changelog record is formatted according to a proprietary changelog format associated with the directory server from which the changelog record is received, and where each directory server is associated with a different proprietary changelog format. The method further comprises virtualizing, by the computer system, the plurality of changelog records such that the virtualized changelog records are formatted according a standard changelog format, and returning, by the computer system, the virtualized changelog records.

In one embodiment, virtualizing the plurality of changelog records comprises, for each changelog record, mapping attributes in the changelog record from the proprietary changelog format to the standard changelog format.

In one embodiment, each changelog record identifies a change to a base directory entry maintained by the directory server from which the changelog record is received.

In one embodiment, each virtualized changelog record includes a first attribute representing an identifier of the virtualized changelog record that is unique to the directory server from which the changelog record is received; a second attribute identifying the type of change made to the base directory entry; a third attribute identifying all of the changes made to the base directory entry; and a fourth attribute identifying the base directory entry.

In one embodiment, each directory server is associated with a changelog adapter executing on the computer system, and the virtualizing of changelog records received from the directory server is performed by the changelog adapter.

In one embodiment, virtualizing the plurality of changelog records comprises, for each changelog record, adding a new attribute to the changelog record, the new attribute reflecting a name of the changelog adapter.

In one embodiment, virtualizing the plurality of changelog records comprises, for each changelog record, determining whether the base directory entry is a standalone entry or a shadow entry; and if the base directory entry is a standalone entry, mapping the fourth attribute of the virtualized changelog record to a distinguished name of the standalone entry.

In one embodiment, if the base directory entry is a shadow entry and if the second attribute of the virtualized changelog record identifies the type of change as a modify or add attribute operation, the method further comprises determining a primary entry associated with the shadow entry and mapping the fourth attribute of the virtualized changelog record to a distinguished name of the primary entry.

In one embodiment, determining the primary entry associated with the shadow entry comprises determining a base adapter associated with the changelog adapter, the base adapter being configured to join the primary entry with the shadow entry to present a single directory entry to a client requesting the primary entry; and determining the distinguished name of the primary entry from the base adapter.

In one embodiment, if a first directory server in the plurality of directory servers is an Active Directory server, changelog records received from the Active Directory server correspond to base directory entries with a uSNChanged attribute, and virtualizing a changelog record received from the Active Directory server comprises mapping the value of the uSNChanged attribute to the first attribute in the virtualized changelog record.

In one embodiment, virtualizing a changelog record received from the Active Directory server further comprises including all of the attributes in the base directory entry within the third attribute in the virtualized changelog record.

According to another embodiment of the present invention, a non-transitory computer readable storage medium is provided. The non-transitory computer readable storage medium has stored thereon program code executable by a processor, the program code comprising code that causes the processor to receive a plurality of changelog records from a plurality of directory servers, each changelog record being formatted according to a proprietary changelog format associated with the directory server from which the changelog record is received, each directory server being associated with a different proprietary changelog format; code that causes the processor to virtualize the plurality of changelog records such that the virtualized changelog records are formatted according a standard changelog format; and code that causes the processor to return the virtualized changelog records.

According to another embodiment of the present invention, a system is provided that comprises a processor. In various embodiments, the processor is configured to receive a plurality of changelog records from a plurality of directory servers, each changelog record being formatted according to a proprietary changelog format associated with the directory server from which the changelog record is received, each directory server being associated with a different proprietary changelog format; virtualize the plurality of changelog records such that the virtualized changelog records are formatted according a standard changelog format; and return the virtualized changelog records.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide a consolidated view of directory changes across different directory servers. In one set of embodiments, a changelog record can be received from a directory server, where the directory server is associated with a proprietary changelog format, and where the changelog record is formatted according to the proprietary changelog format. The received changelog record can then be translated into a virtualized changelog record that is formatted according to a standard changelog format, and the virtualized changelog record can be sent to a consuming client. With this virtualization capability, the client does not need to be concerned with, or even aware of, the proprietary changelog mechanisms/formats that may be used by different directory servers in a multi-server deployment. Rather, the client need only recognize a single, standard changelog format.

In a further set of embodiments, a "changelog cookie" can be generated for a virtualized changelog record prior to sending the record to a client. In various embodiments, the changelog cookie can act as a globally unique identifier—i.e., an identifier that distinguishes the virtualized changelog record from other virtualized changelog records (and thus, uniquely identifies the record across all directory servers in a deployment). With such a cookie, a client can easily determine the directory server that a given virtualized changelog record originated from. In certain embodiments, changelog cookies can also be used to determine the latest, global changelog state of all directory servers in a deployment and to query for any incremental changes that have occurred since that global changelog state.

Embodiments of the present invention can be used in a variety of different domains and contexts. For example, certain embodiments can be incorporated into a virtual directory server such as Oracle Virtual Directory (developed by Oracle Corporation), thereby enabling the virtual directory server to provide a virtual interface to both directory information and changelog information maintained by various, disparate data sources (e.g., directory servers, relational databases, etc.). Embodiments of the present invention can also be applied to any other type of data integration service or server.

Figure 1:
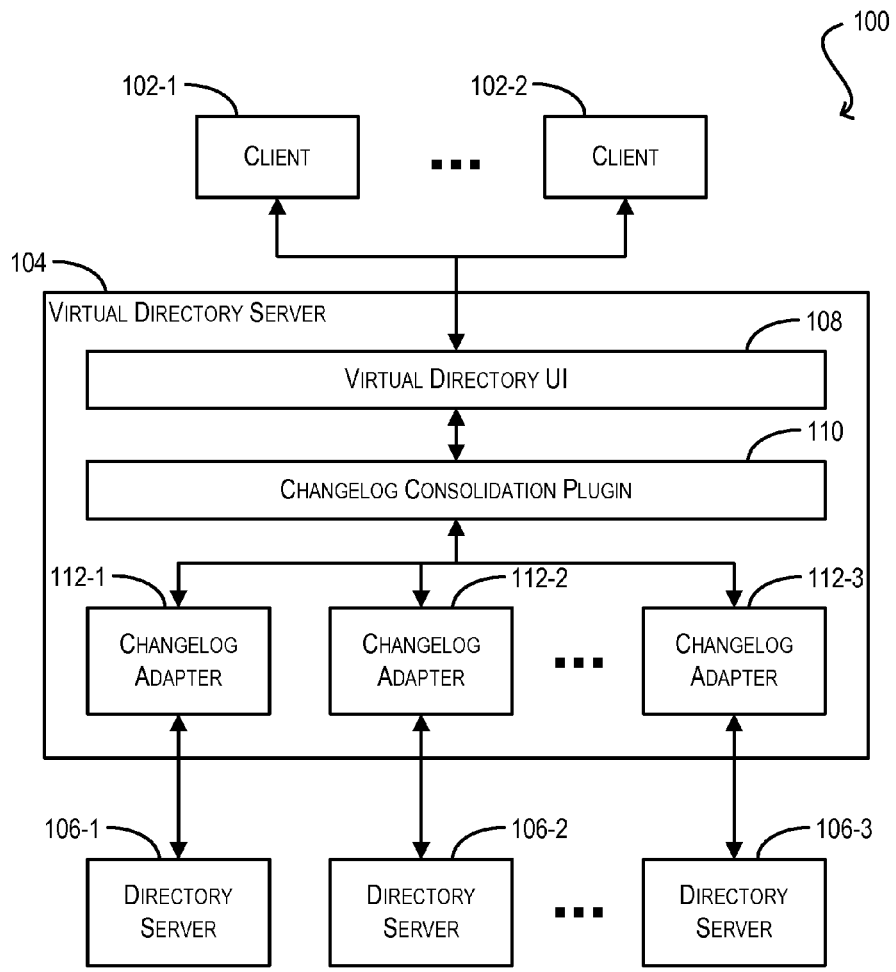
FIG. 1 is a simplified block diagram of a system in accordance with an embodiment of the present invention.

FIG. 1 is a simplified block diagram of a system 100 according to an embodiment of the present invention. As shown, system 100 can include a number of directory servers 106-1, 106-2, 106-3 that are communicatively coupled with a virtual directory server 104. Virtual directory server 104 can, in turn, be communicatively coupled with a number of clients 102-1, 102-2. Although three directory servers, one virtual directory server, and two clients are depicted, it should be appreciated that any number of such entities can be supported.

Directory servers 106-1, 106-2, 106-3 can be software and/or hardware-based systems that are configured to store, organize, and provide access to information in data stores referred to as directories. As used herein, a directory is a set of data records (i.e., directory entries), typically organized according to a hierarchical structure. A directory is similar in some respects to a conventional database, but is also distinguishable in that a directory is optimized for data reading (since it is assumed that data writes, in comparison to data reads, are rare). Each directory entry can include a unique identifier, known as a distinguished name, and a set of attributes. The set of attributes can define the various pieces of information that are associated with the entry. By way of example, in a corporate user directory, each directory entry can correspond to a user/employee in the organization and can include user name, telephone, email, and manager name attributes for that user.

In one set of embodiments, directory servers 106-1, 106-2, 106-3 can expose various operations for accessing the data stored in their respective directories. Examples of such operations including browsing, querying, modifying, adding, and deleting directory entries. In one embodiment, these operations can be exposed through LDAP, a standard protocol for accessing distributed directory services over IP networks. Alternatively, these operations can be exposed through any other type of communication protocol.

In certain embodiments, directory servers 106-1,-106-2, 106-3 can also track changes made to their respective directories and can expose operations for accessing that change information. For example, in one embodiment, each directory server 106-1,-106-2, 106-3 can maintain a changelog comprising a sequence of records, where each record identifies a particular directory change such as an entry modification, addition, or deletion. These changelog records can be accessed by other entities (e.g., clients 102-1, 102-2) for various purposes such as directory replication, reconciliation, maintaining application compatibility, and so on.

As noted in the Background section, there are a number of different directory server implementations developed by different vendors, such as Oracle Internet Directory (OID), Active Directory (AD), Sun Java System Directory Server (SJSDS), and the like. Since change tracking is not formally part of the LDAP standard (or any other widely adopted directory access standard), each implementation generally uses a proprietary changelog mechanism and format. For instance, OID generates a separate changelog record for each change to a directory entry, and uses a unique "changenumber" attribute associated with the changelog record to identify the change. In contrast, AD updates a "uSNchanged" attribute on a directory entry (rather than generating a separate changelog record object) to record a change to the entry.

These various approaches to change tracking can be problematic in a multi-server deployment as shown in FIG. 1. For example, assume that directory server 106-1 is an instance of OID, directory server 106-2 is an instance of AD, and directory server 106-3 is an instance of SJSDS. In this scenario, clients that are designed to consume directory changelog information from 106-1, 106-2, and 106-3 (e.g., clients 102-1, 102-2) must be programmed to understand the various changelog mechanisms/formats used by OID, AD, and SJSDS and to handle those formats appropriately. Further, since OID, AD, and SJSDS each employ a different (and possibly overlapping) changelog identification scheme, clients 102-1, 102-2 may be unable to easily determine which directory server a particular changelog record originated from.

To address these (and other similar) problems, requests for changelog information from clients 102-1, 102-2 and corresponding responses from directory servers 106-1, 106-2, 106-3 can be routed through an intermediary entity—virtual directory server 104. In various embodiments, virtual directory server 104 can translate, or virtualize, changelog requests and responses that are communicated between clients 102-1, 102-2 and directory servers 106-1, 106-2, 106-3, thereby providing a standardized and consolidated interface for accessing changelog information across different directory server implementations. In a particular embodiment, virtual directory server 104 can be an instance of Oracle Virtual Directory. In other embodiments, virtual directory server 104 can be implemented using any other type of virtual directory or data integration service.

As shown in FIG. 1, virtual directory server 104 can include a virtual directory UI 108, a changelog consolidation plugin 110, and a number of changelog adapters 112-1, 112-2, 112-3. Virtual directory UI 108 is a user interface layer that can receive requests, such as queries for changelog records, from clients 102-1, 102-2 and pass those requests to downstream components of virtual directory server 104 (e.g., changelog consolidation plugin 110). Virtual directory UI 108 can also receive responses to those requests and generate a user interface for presenting that information to clients 102-1, 102-2.

In some embodiments, virtual directory UI 108 can be replaced (or supplemented) by a programmatic layer, such as a library of application programming interfaces (APIs). This programmatic layer can allow clients 102-1, 102-2 to communicate with components of virtual directory server 104 via API calls rather than a user interface.

Changelog consolidation plugin 110 and changelog adapters 112-1, 112-2, 112-3 can operate in concert to carry out various changelog virtualization functions provided by virtual directory server 104. For instance, in one set of embodiments, changelog adapters 112-1, 112-2, 112-3 can translate changelog records received from directory servers 106-1, 106-2, 106-3 into a standard, virtualized format. Changelog consolidation plugin 110 can then generate an identifier for each virtualized changelog record (i.e., changelog cookie) that enables clients (e.g., 102-1, 102-2) to unique identify the record.

By way of example, assume that client 102-1 or 102-2 is interested in querying one or more changelog records maintained by directory servers 106-1, 106-2, 106-3. Changelog consolidation plugin 110 can receive an appropriate query from the client (e.g., via virtual directory UI 108) and forward the query to changelog adapters 112-1, 112-2, 112-3. In various embodiments, each changelog adapter is configured to provide virtualization functions for an associated directory server implementation. For example, in the embodiment of FIG. 1, changelog adapter 112-1 is configured to provide virtualization functions for directory server 106-1 (e.g., an OID implementation), changelog adapter 112-2 is configured to provide virtualization functions for directory server 106-2 (e.g., an AD implementation), and changelog adapter 112-3 is configured to provide virtualization functions for directory server 106-3 (e.g., an SJSDS implementation). Accordingly, upon receiving the query from changelog consolidation plugin 110, each changelog adapter 112-1, 112-2, 112-3 can convert the query into a format understood by its associated directory server and send the converted query to the directory server.

Once the queries have been processed by directory servers 106-1, 106-2, 106-3, each changelog adapter can receive from its associated directory server a set of changelog records, where the changelog records are formatted according to a proprietary changelog format used by that directory server. For instance, changelog adapter 112-1 can receive from directory server 106-1 changelog records formatted according a proprietary format specific to OID, changelog adapter 112-2 can receive from directory server 106-2 changelog records formatted according to a proprietary format specific to AD, and changelog adapter 112-3 can receive from directory server 106-3 changelog records formatted according to a proprietary format specific to SJSDS.

Each changelog adapter 112-1, 112-2, 112-3 can then translate, or virtualize, the received changelog records into a standard changelog format. The virtualization process can include, for example, mapping attributes from the proprietary changelog format of the received record to the standard changelog format. The virtualization process can also include other types of processing, such as handling "split profile" deployment scenarios, that are described in further detail below. In one set of embodiments, the standard changelog format can be based on a draft LDAP format, such as the draft format described at http://tools.ietf.org/html/draft-good-ldap-changelog-04, which is incorporated herein by reference for all purposes. In other embodiments, the standard changelog format can be any other changelog format that is uniformly implemented by the changelog adapters of virtual directory server 104.

Upon receiving the virtualized changelog records from changelog adapters 112-1, 112-2, 112-3, changelog consolidation plugin 110 can generate, for each virtualized changelog record, an identifier referred to as a changelog cookie. The changelog cookie can serve a number of functions. In one set of embodiments, the changelog cookie can uniquely identify the virtualized changelog record across all directory servers in a deployment. Thus, the cookie can be used to determine which directory server the record originated from. In a further set of embodiments, the changelog cookie can also include information pertaining to the changelog states of other directory servers in the deployment. Accordingly, in certain embodiments, changelog cookies can be used to identify a latest, global changelog state for all directory servers, and to query for changes that have occurred since that global changelog state.

By way of example, a changelog cookie can be a string that has the following format:

```
<changelogAdapter1>:<changenumber1>;<changelogAdapter2>:<changenumber2>;
<changelogAdapter3>:<changenumber3>;...
```

The first "<changelogAdapter1>:<changenumber1>;" pair in the string can identify the name of the changelog adapter that a virtualized changelog record was received from and the changelog identifier (e.g., "changenumber") assigned to the record by the associated directory server. For example, if a virtualized changelog record is received from changelog adapter 112-1, the first pair can identify the name of adapter 112-1 and the changelog identifier assigned to the record by directory server 106-1. The remaining "<changelogAdapterX>:<changenumberX>;" pairs in the changelog cookie can identify the names of other changelog adapters and the latest changelog identifiers that have been received for those adapters/directory servers. Returning to the example above, the remaining pairs can identify the names of changelog adapters 112-2 and 112-3 (i.e., the adapters in virtual directory server 104 other than 112-1) and the latest changelog identifiers received assigned by directory servers 106-2 and 106-3. Thus, these pairs can indicate the changelog states of servers 106-2 and 106-3.

Once changelog cookies have been generated for the virtualized changelog records received from changelog adapters 112-1, 112-2, 112-3, changelog consolidation plugin 110 can include the cookies in the records and return the records to the requesting client (e.g., via virtual directory UI 108). The client can then process the records as needed.

With the functionality described above, clients 102-1, 102-2 do not need to be concerned with the specific proprietary changelog mechanisms/formats implemented by directory servers 106-1, 106-2, 106-3 when processing changelog records; from the client's perspective, the changelog records appear to originate from a single, standard directory server implementation. Thus, the problems associated with managing directory change information in a multi-server deployment are significantly reduced or eliminated. Further, in certain embodiments, the changelog cookie mechanism can enable clients to determine the latest, global changelog state for all directory servers in a deployment and to query for incremental changes that may have occur since that global changelog state.

It should be appreciated that system 100 of FIG. 1 is illustrative and not intended to limit embodiments of the present invention. For example, the various entities depicted in system 100 can have other capabilities or include other components that are not specifically described. One of ordinary skill in the art will recognize other variations, modifications, and alternatives.

Figure 2:
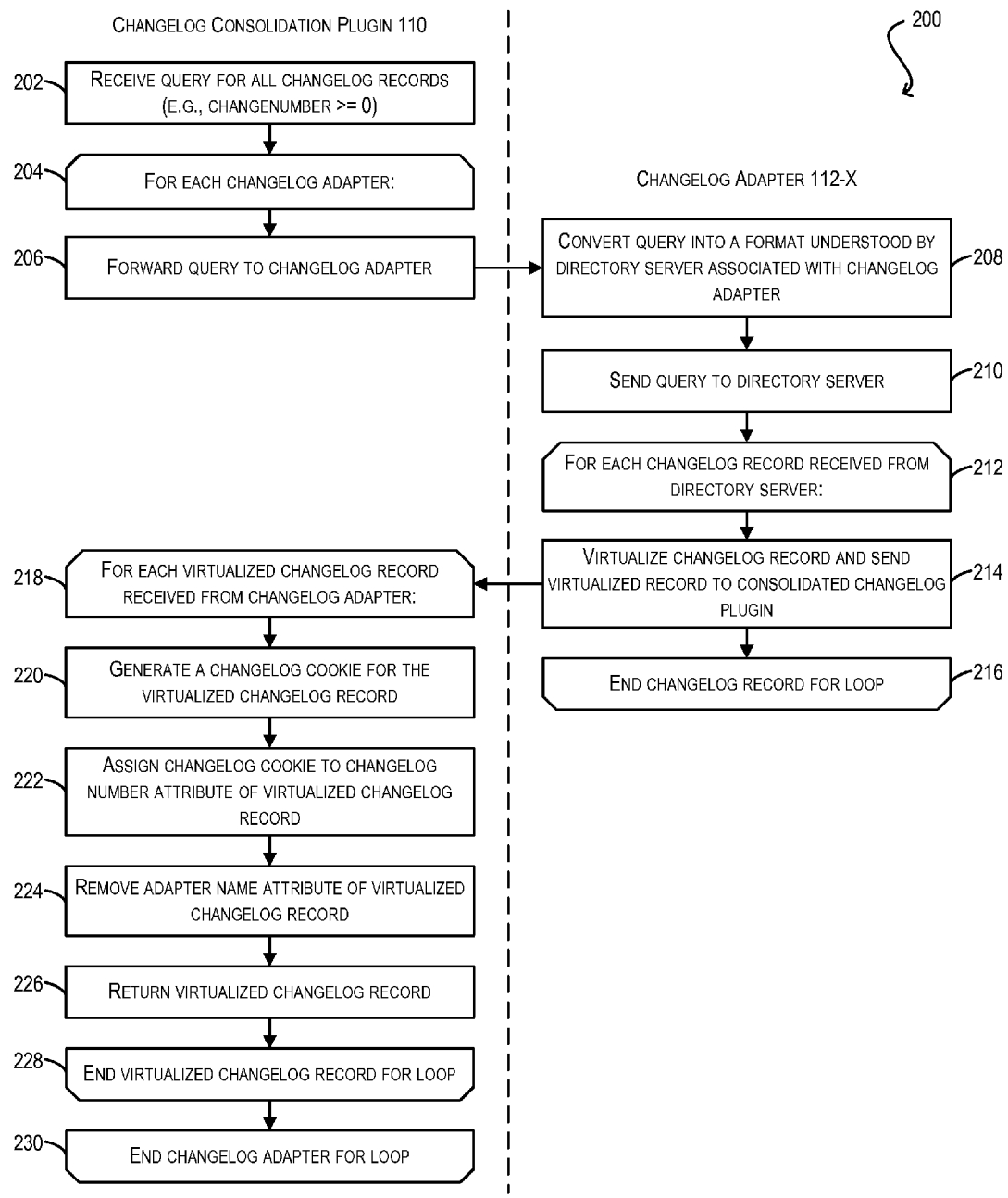
FIG. 2 is a flow diagram of a process for retrieving all changelog records maintained by a plurality of directory servers in accordance with an embodiment of the present invention.

FIG. 2 is a flow diagram of a process 200 for retrieving all of the changelog records maintained by a plurality of directory servers according to an embodiment of the present invention. In one set of embodiments, process 200 can be carried out by changelog consolidation plugin 110 and changelog adapters 112-1, 112-2, 112-3 of FIG. 1. Process 200 can be implemented in hardware, software, or a combination thereof. As software, process 200 can be encoded as program code encoded on a non-transitory computer readable storage medium.

At block 202, changelog consolidation plugin 110 can receive a query for all changelog records maintained by a group of directory servers in a deployment (e.g., directory servers 106-1, 106-2, 106-3), where each directory server corresponds to a different directory server implementation (e.g., OID, AD, SJSDS, etc.), and thus each directory server implements a different changelog mechanism/format. The query can be received from, e.g., client 102-1 or 102-2 via virtual directory UI 108, or from another source not depicted in FIG. 1. In a particular embodiment, the query can be expressed in a standard format understood by changelog consolidation plugin 110, such as a query for all changelog identifiers greater than or equal to a base identifier (e.g., "changenumber>=0").

At block 204, changelog consolidation plugin 110 can enter a loop for each changelog adapter that is part of virtual directory server 104 (e.g., changelog adapters 112-1, 112-2, 112-3). At block 206, changelog consolidation plugin 110 can forward the query to the current changelog adapter in the loop (e.g., changelog adapter 112-X).

At block 208, changelog adapter 112-X can convert the query into a format that is understood by its associated directory server (e.g., directory server 106-X). For example, if the associated directory server is an instance of OID, the adapter can convert the query into a format understood by OID. Adapter 112-X can then send the converted query to the directory server (block 210).

Once directory server 106-X has processed the query and begun returning changelog records, changelog adapter 112-X can enter a loop for each returned record (block 212). Within this loop, adapter 112-X can translate, or virtualize, the record from the proprietary changelog format supported by directory server 106-X to a standard changelog format (block 214). This virtualization process can include, for example, mapping attributes from the proprietary format to the standard format, and adding an "adaptername" attribute to the record that identifies changelog adapter 112-X. The virtualization process can also include other steps, such as generating a new changelog record from a base directory entry (in the case of AD), or accounting for "split profile" deployment scenarios, that are described in detail with respect to FIG. 5 below. The output of block 214—a virtualized changelog record—can be sent to changelog consolidation plugin 110, and block 214 can be repeated until all changelog records received from directory server 106-X have been processed (block 216).

At block 218, changelog consolidation plugin 110 can enter a loop for each virtualized changelog record received from changelog adapter 112-X, and at block 220 can generate a changelog cookie for the current virtualized changelog record. As described above, the changelog cookie can act as a globally unique identifier—in other words, an identifier that distinguishes the virtualized changelog record from other virtualized changelog records (and thus, uniquely identifies the record across all directory servers 106-1, 106-2, 106-3). In a particular embodiment, the changelog cookie can comprise a series of "changelogAdapter" and "changenumber" pairs, where the first pair identifies the changelog adapter (e.g., 112-X) that the current record was received from and the changelog identifier assigned by the associated directory server (e.g., 106-X) to the changelog record. The remaining pairs can identify the other changelog adapters in virtual directory server 104 and the latest changelog identifiers assigned by their associated directory servers.

Once the changelog cookie has been generated, changelog consolidation plugin 110 can assign the cookie to a changelog identifier attribute (e.g., "changenumber") of the virtualized changelog record (block 222). Plugin 110 can also remove from the record the "adaptername" attribute that was added at block 214 by changelog adapter 112-X (block 224). The virtualized changelog record can then be returned to the original requestor (block 226). At block 228, the for loop for the virtualized changelog records received from changelog adapter 112-X can end, and at block 230 the for loop for the changelog adapters can end.

It should be appreciated that process 200 is illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Figure 3:
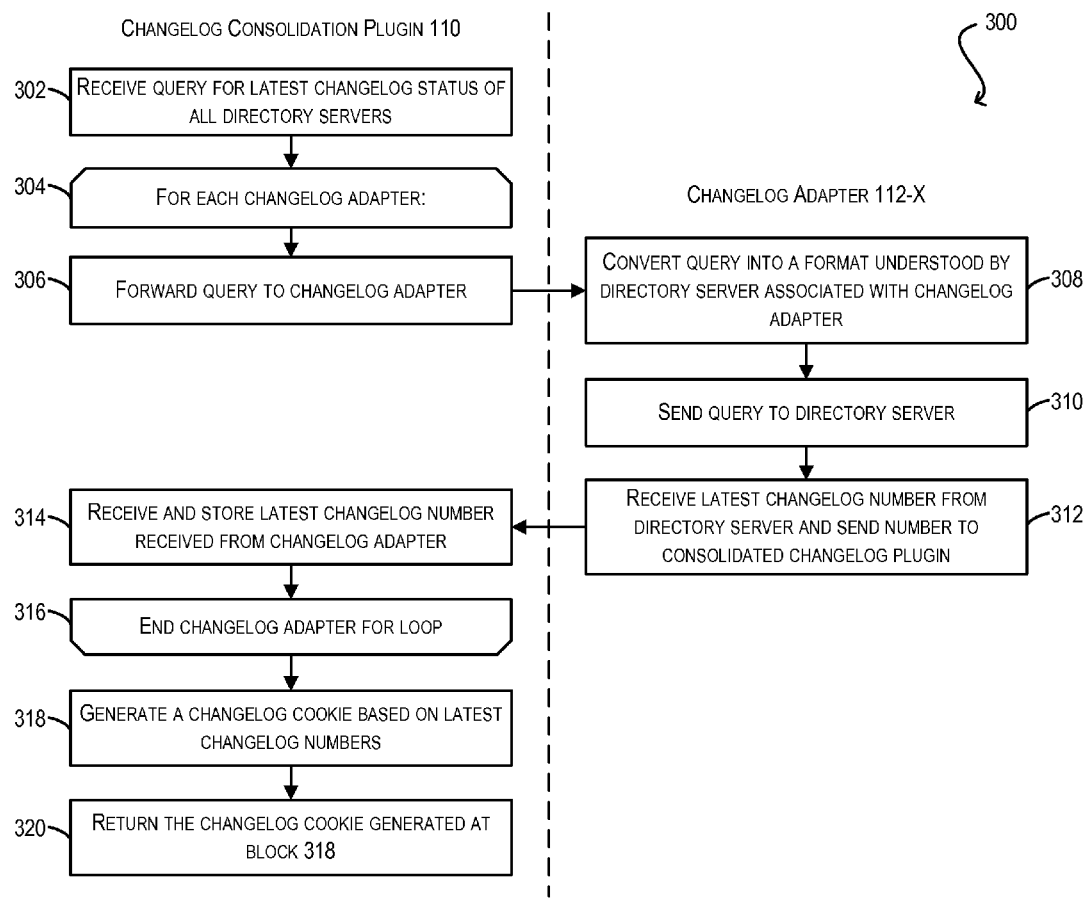
FIG. 3 is a flow diagram of a process for retrieving the latest, global changelog state of a plurality of directory servers in accordance with an embodiment of the present invention.

As noted above, the changelog cookies generated by changelog consolidation plugin 110 can not only identify the directory server that a particular virtualized changelog record originated from, but can also identify the changelog states of other directory servers. Thus, in certain embodiments, the changelog cookie mechanism can be used to provide to clients (e.g., 102-1, 102-2) the latest, global changelog state for all directory servers in a deployment. This functionality can be useful if, for example, clients 102-1, 102-2 need to recover such state information after a bootstrap or encountering an error condition due to an invalid cookie. FIG. 3 is a flow diagram of a process 300 for retrieving a latest, global changelog state according to an embodiment of the present invention. Like process 200 of FIG. 2, process 300 can be carried out by changelog consolidation plugin 110 and changelog adapters 112-1, 112-2, 112-3 of FIG. 1. Process 300 can be implemented in hardware, software, or a combination thereof. As software, process 300 can be encoded as program code encoded on a non-transitory computer readable storage medium.

At block 302, changelog consolidation plugin 110 can receive a query for the latest, global changelog state of directory servers 106-1, 106-2, 106-3. In a particular embodiment, the query can be expressed in a standard format understood by changelog consolidation plugin 110, such as a query for "lastChangeNumber."

At block 304, changelog consolidation plugin 110 can enter a loop for each changelog adapter that is part of virtual directory server 104 (e.g., changelog adapters 112-1, 112-2, 112-3). At block 306, plugin 110 can forward the query to the current changelog adapter in the loop (e.g., changelog adapter 112-X).

At block 308, changelog adapter 112-X can convert the query into a format that is understood by its associated directory server (e.g., directory server 106-X). For example, if the associated directory server is an instance of OID, the adapter can convert the query into a format understood by OID. Adapter 112-X can then send the converted query to directory server 106-X (block 310).

Once directory server 106-X has processed the query, changelog adapter 112-X can receive from directory server 106-X a changelog identifier (e.g., a changelog number) that identifies the last change that was made to the directory server. This changelog identifier is then communicated to changelog consolidation plugin 110 (block 312).

At block 314, changelog consolidation plugin 110 can receive the changelog identifier from changelog adapter 112-X and can store the identifier in memory. At block 316, the for loop for changelog adapters can end. Once changelog consolidation plugin 110 has received and stored changelog identifiers for every adapter, plugin 110 can generate a changelog cookie based on stored changelog identifiers (block 318). In various embodiments, this changelog cookie represents the latest, global changelog state of directory servers 106-1, 106-2, 106-3.

By way of example, if changelog number 101 is received from adapter 112-1 ("Adapted"), changelog number 201 is received from adapter 112-2 ("Adapter2"), and changelog number 53 is received from adapter 112-3 ("Adapter3"), the resulting changelog cookie can be expressed as:
<Adapter1>:<101>;<Adapter2>:<201>;<Adapter3>:<53>;

At block 320, changelog consolidation plugin 110 can return the changelog cookie generated at block 318 to the original requestor.

It should be appreciated that process 300 is illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Figure 4:
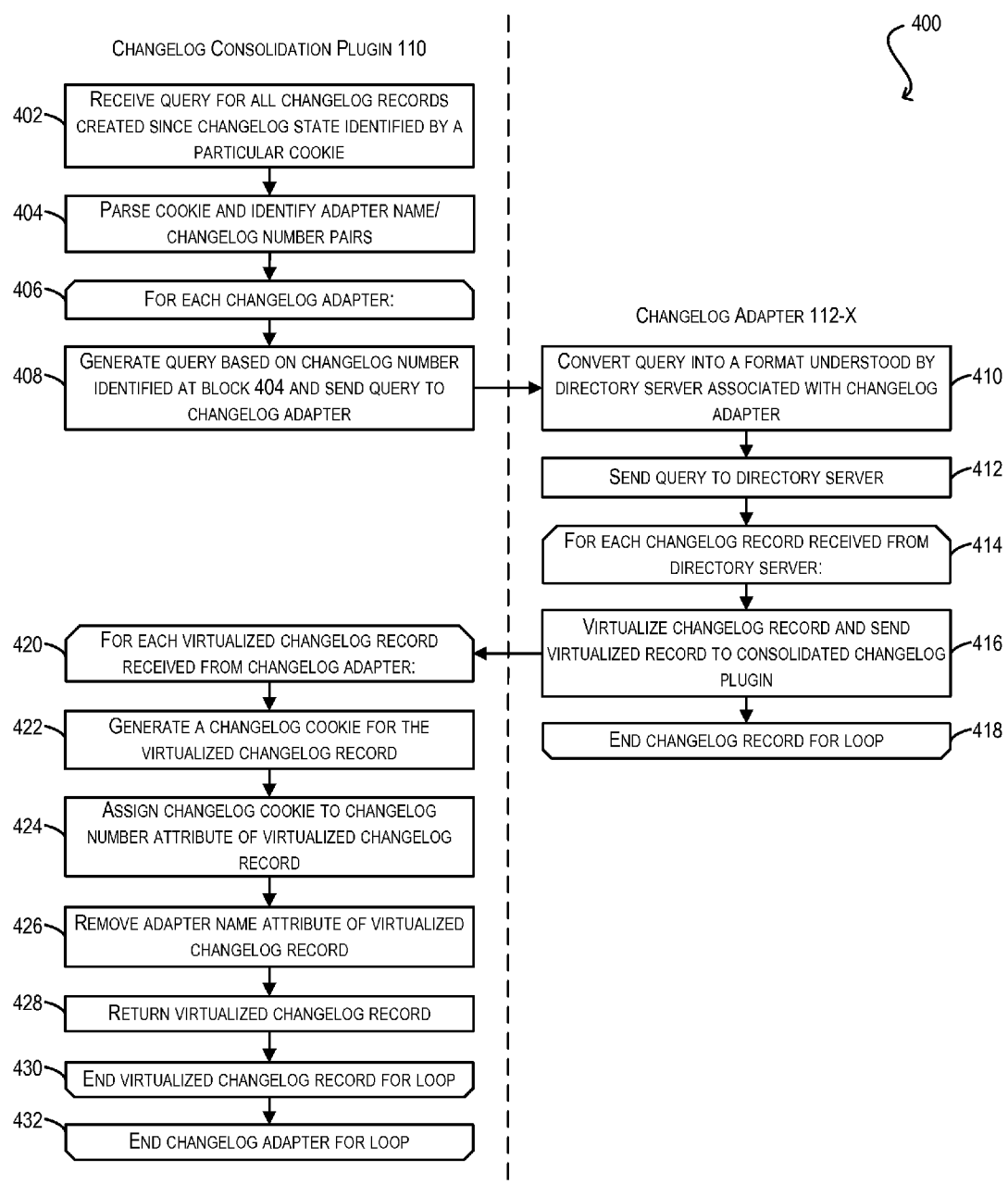
FIG. 4 is a flow diagram of a process for retrieving directory changes that have occurred since a given global changelog state in accordance with an embodiment of the present invention.

Once client 102-1 or 102-2 has received a changelog cookie representing the latest, global changelog state of directory servers 106-1, 106-2, 106-3, the client can use that cookie to retrieve changes that have occurred to servers 106-1, 106-2, 106-3 since that global changelog state. This process (400) is depicted in FIG. 4. Like processes 200 and 300, process 400 can be carried out by changelog consolidation plugin 110 and changelog adapters 112-1, 112-2, 112-3 of FIG. 1. Process 400 can be implemented in hardware, software, or a combination thereof. As software, process 400 can be encoded as program code encoded on a non-transitory computer readable storage medium.

At block 402, changelog consolidation plugin 110 can receive a query for all changelog records that have been created by directory servers 106-1, 106-2, 106-3 since a global changelog state identified by a particular cookie. For example, the query can request all changelog records created since a global changelog state identified by the cookie generated and returned in process 300. In a particular embodiment, the query can be expressed in a standard format understood by changelog consolidation plugin 110, such as a query for "changenumber>=<changelogcookie>."

At block 404, changelog consolidation plugin 110 can parse the cookie included in the query to identify the <changelogAdapter>, <changenumber> pairs in the cookie. Plugin 110 can then enter a for loop for each changelog adapter that is part of virtual directory server 104 (e.g., 112-1, 112-2, 112-3), and can generate a query for the current changelog adapter based on the information parsed at block 404 (blocks 406, 408). For example, if plugin 110 determines that the changelog identifier for a given changelog adapter 112-X in the changelog cookie is 101, plugin 110 can generate a query such as "changenumber>=101" and pass the query to adapter 112-X.

At blocks 410-418, changelog adapter 112-X can process the query in a manner substantially similar to blocks 208-216 of FIG. 2. For instance. adapter 112-X can send the query to associated directory server 106-X and then virtualize the changelog records that are received from the directory server.

At blocks 420-432, changelog consolidation plugin 110 can process the received virtualized changelog records in a manner substantially similar to blocks 218-230 of FIG. 2. For instance, changelog consolidation plugin 110 can generate and assign an appropriate changelog cookie to each record, and then return the record to the original requestor.

It should be appreciated that process 400 is illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Figure 5:
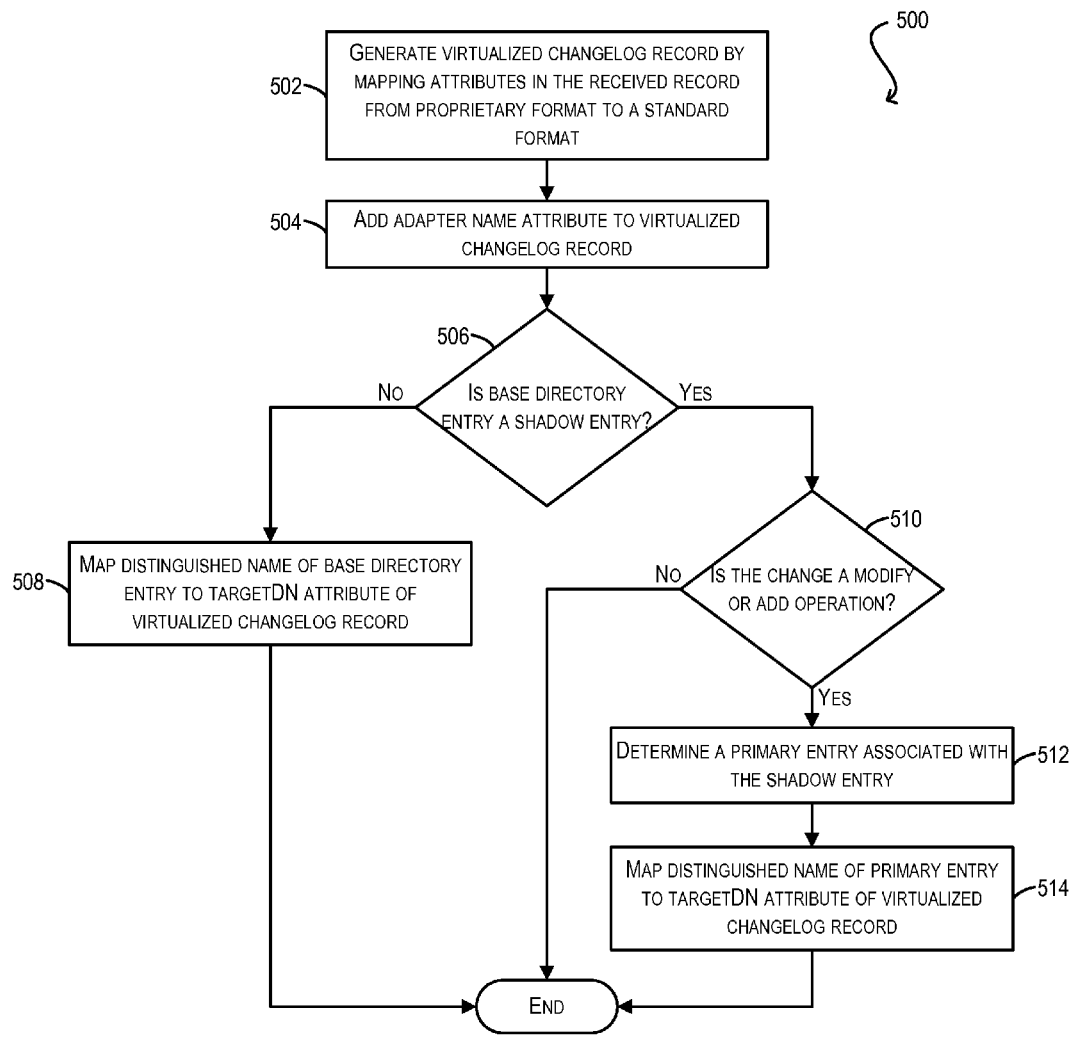
FIG. 5 is a flow diagram of a process for virtualizing a changelog record in accordance with an embodiment of the present invention.

FIG. 5 is a flow diagram of a process 500 that provides additional details on the virtualization performed by each changelog adapter 112-X at blocks 214 and 416 of FIGS. 2 and 4 respectively. Process 500 can be implemented in hardware, software, or a combination thereof. As software, process 500 can be encoded as program code encoded on a non-transitory computer readable storage medium.

At block 502, changelog adapter 112-X can map attributes of a received changelog record from the proprietary format of the record to a standard changelog format. For example, the proprietary changelog formats that are supported by different directory server implementations may specify attribute names or restrictions that are slightly (or significantly) different from each other. Thus, this mapping process can ensure that the changelog records generated by these different implementations are translated into a standard and consistent format. Once this mapping process is performed, a virtualized changelog record is created.

The following is an example of a virtualized changelog record::

```
dn: changenumber=2171867,cn=changelog
changeType: modify
changeNumber: 2171867
targetGuid: 30584484-712311e0-80dad76d-e983e523
changes: replace: description
    description: This is a second user for the test
    -
    replace: modifiersname
    modifiersname: cn=directory manager
    -
    replace: modifytimestamp
    modifytimestamp: 20110427230802Z
    targetGuid: 30584484-712311e0-80dad76d-e983e523
targetDN: cn=mary7,dc=oracle,dc=com
objectclass: top
objectclass: changelog
```

As shown, the virtualized changelog record can include a number of standard attributes including "changeNumber," "changeType," "changes," and "targetDN." The changeNumber attribute can be populated with the changelog identifier assigned to the record by directory server 106-X. As described with respect to FIGS. 2 and 4, this attribute value can be replaced by a changelog cookie value generated by changelog consolidation plugin 110 prior to returning the record to a client. The changeType attribute can indicate the type of directory changes that are reflected by the current record. For example, the changeType can be a modify, delete, or add change. The changes attribute describes the changes themselves, such as a new description or a replacement name. And the targetDN attribute identifies the distinguished name of the directory entry in directory server 106-X that was affected by the change (referred to herein as the base directory entry).

It should be appreciated that the virtualized changelog record shown above is provided for illustration purposes only and may include more or few attributes than shown. Further, the attribute names and formats may differ depending on the standard changelog format that is chosen.

In certain embodiments, the changelog record received by changelog adapter 112-X from directory server 106-X may not be a changelog record per se, but rather a base directory entry with change information embedded in the entry. For instance, AD records a directory change by updating a "uSNchanged" attribute on a directory entry that has been modified (rather than generating a separate changelog record object). In these embodiments, the processing at block 502 may include parsing the base directory entry and using the information in the entry to generate a new virtualized changelog record. For example, in the case of AD, changelog adapter 112-X can extract the value of "uSNchanged" attribute from the base directory entry and use that value as the "changenumber" attribute for a new virtualized changelog record. Changelog adapter 112-X can also extract certain attribute values from in the base directory entry and record those values in the "changes" attribute of the virtualized changelog record. Since AD directory entries do not clearly indicate which attributes have been modified and/or added, in certain embodiments all of the attribute values from the entry can be incorporated into the "changes" attribute, thereby enabling a client application to determine which portions of the entry have changed (e.g., by comparing the latest version with a prior version).

Once a virtualized changelog record has been generated at block 502, adapter 112-X can add an "adapterName" attribute to the record and can populate the attribute with the name of adapter 112-X (block 504). As described with respect to FIGS. 2 and 4, this adapter name information can be used by changelog consolidation plugin 110 to construct a changelog cookie for the record.

The remainder of process 500 deals with steps that can be performed to account for a directory deployment scenario where the primary attributes for a directory entry (including the distinguished name for the entry) are stored/maintained by a primary directory server, and secondary (e.g., extended) attributes for the same directory entry are stored/maintained by a secondary directory server. In various embodiments, this is referred to as a "split profile" deployment scenario.

At block 506, changelog adapter 112-X can determine whether the base directory entry for the current virtualized changelog record is a regular entry or a "shadow entry"—in other words, an entry comprising secondary attributes in a split profile scenario. If the base directory entry is not a shadow entry, the distinguished name of the base directory entry will be readily available from the changelog information received from directory server 106-X, and thus the distinguished name can be mapped to the "targetDN" attribute of the virtualized changelog record (block 508). The record can then be sent to changelog consolidation plugin 110.

However, if the base directory entry is a shadow entry, the distinguished name of the primary entry may not be available from the changelog information received from directory server 106-X (because the shadow entry may have a different distinguished name than the primary entry). In this case, changelog adapter 112-X can determine whether the change being made to the base directory entry is an add or modify operation (block 510). If the change is an add or modify, the primary entry corresponding to the shadow entry can be determined (block 512). Changelog adapter 112-X can then retrieve the distinguished name of the primary entry and map the distinguished name to the targetDN attribute of the virtualized changelog record (block 514). In this manner, the virtualized changelog record can always identify a single directory entry (i.e., the primary entry) as the target of a directory change, regardless of whether the change has occurred to the primary or secondary attributes of the entry in a split profile scenario.

Figure 6:
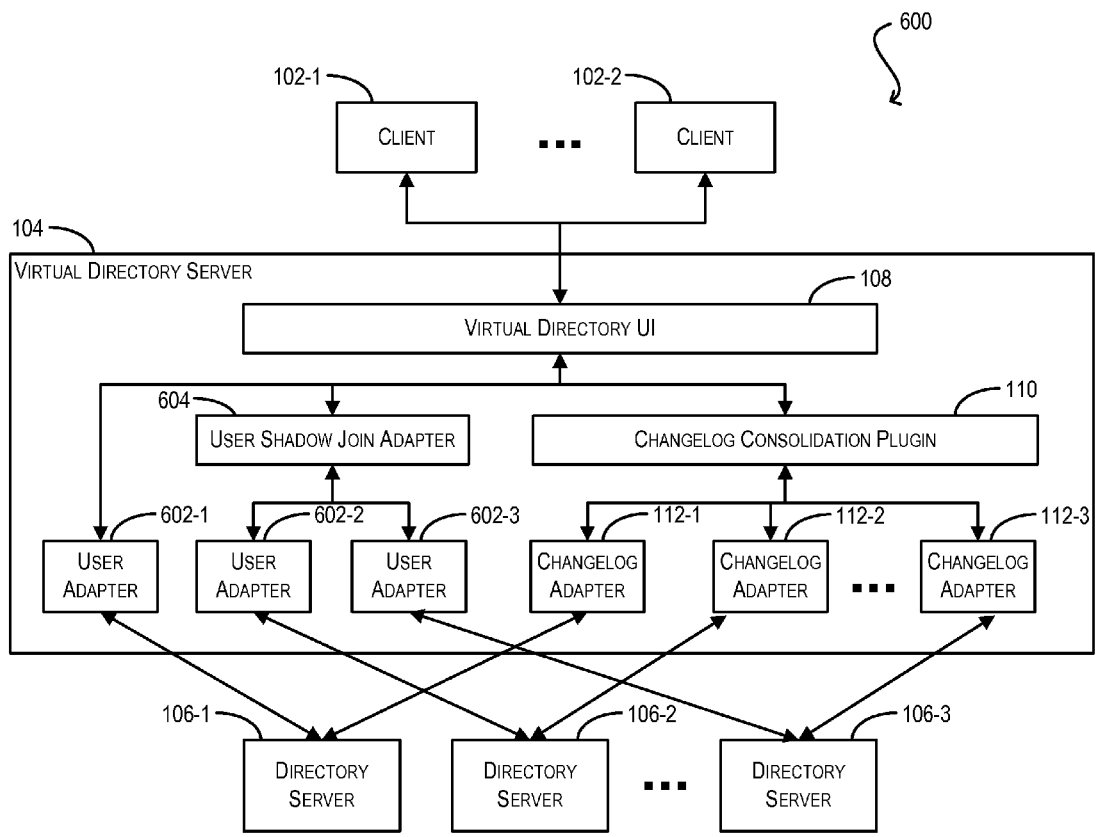
FIG. 6 is a simplified block diagram of an alternative system in accordance with an embodiment of the present invention.

The mechanism for determining the distinguished name of the primary entry can be implemented in various ways. In certain embodiments, virtual directory server 104 may already include one more virtualization components for joining primary and shadow entries in a split profile scenario. For example, FIG. 6 illustrates a system 600 that is substantially similar to system 100 of FIG. 1, but includes user adapters 602-1, 602-2, 602-3 and user shadow join adapter 604. User adapters 602-1, 602-2, 602-3 are configured to virtualize directory information maintained by directory servers 106-1, 106-2, 106-3 and to provide a consolidated view of that directory information to clients 102-1, 102-2. In the embodiment of FIG. 6, directory servers 106-2 and 106-3 are primary and second directory servers, where directory server 106-2 is configured to store primary directory entries comprising primary attributes, and where directory server 106-3 is configured to store shadow entries comprising secondary attributes of the primary entries stored by 106-2. In order to present a consolidated view of directory entries from servers 106-2, 106-3 to clients 102-1, 102-2, user shadow join adapter 604 can include logic for receiving a shadow entry from server 106-3, determining a primary entry from server 106-2 corresponding to the shadow entry, joining the two entries into a single entry (with the distinguished name of the single entry being the distinguished name of the primary entry), and returning the single entry to the clients.

Figure 7:
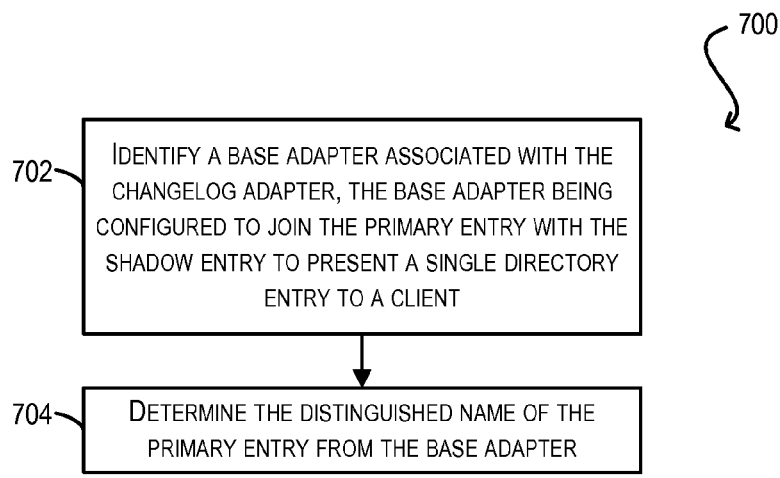
FIG. 7 is a flow diagram of a process for determining the distinguished name of a primary directory entry in accordance with an embodiment of the present invention.

Since user shadow join adapter 604 is already capable determining a primary entry based on a shadow entry, this capability can be leveraged by changelog adapters 112-1, 112-2, 112-3 to determine the distinguished name of a primary entry based on a changelog record for a shadow entry. This process (700) is depicted in FIG. 7. At block 702, changelog adapter 112-X can identify a base adapter associated with the changelog adapter, where the base adapter is configured to join the primary entry and the shadow entry into a single, consolidated entry. For example, the base adapter in this case can correspond to user shadow join adapter 604.

Once the base adapter has been identified, changelog adapter 112-X can provide the distinguished name of the shadow entry to the base adapter. In response, the base adapter can lookup the distinguished name of the primary entry based on the distinguished name of the shadow entry, and provide the distinguished name of the primary entry to changelog adapter 112-X (block 704). Changelog adapter 112-X can then map this distinguished name the "targetDN" attribute of the virtualized changelog record.

t should be appreciated that processes 500 and 700 are illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Figure 8:
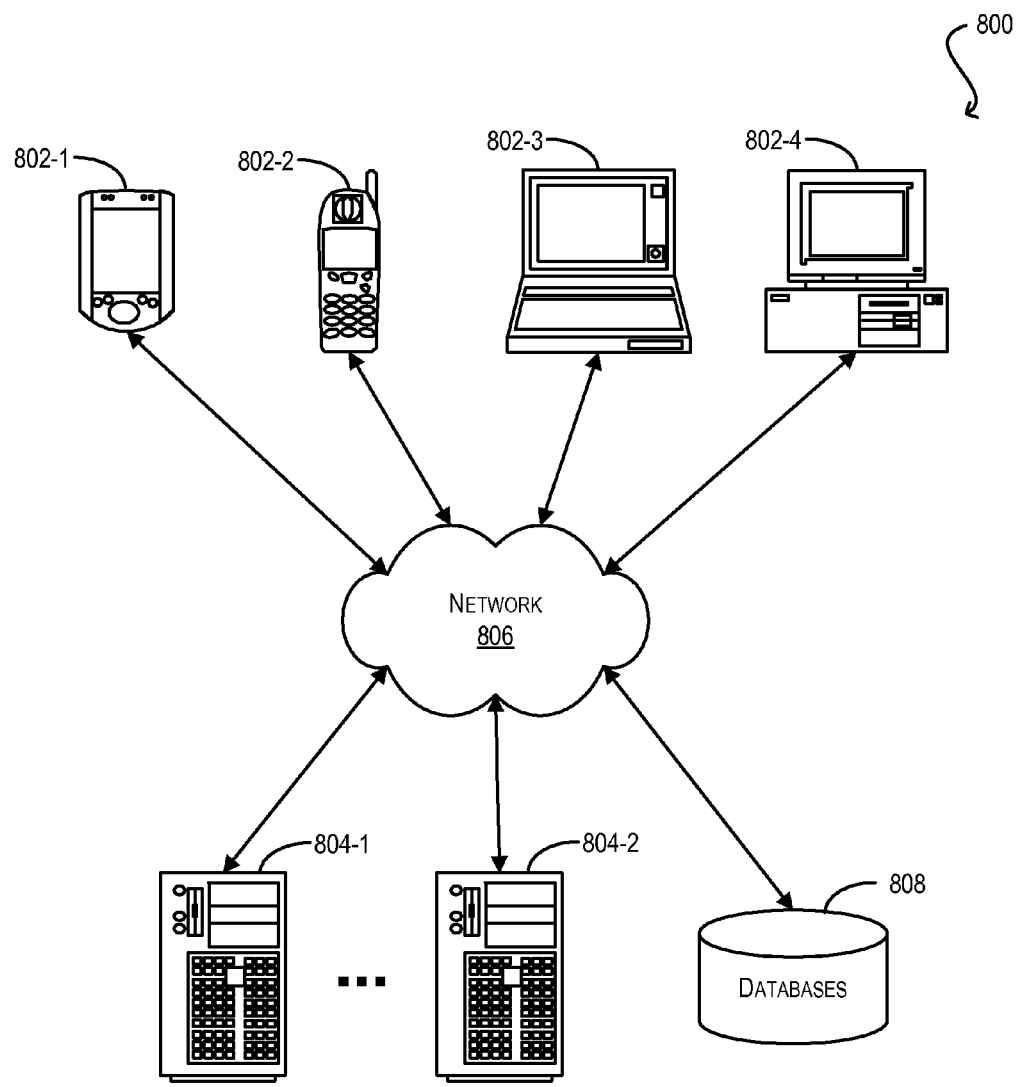
FIG. 8 is a simplified block diagram of a system environment in accordance with an embodiment of the present invention.

FIG. 8 is a simplified block diagram illustrating a system environment 800 that can be used in accordance with an embodiment of the present invention. As shown, system environment 800 can include one or more client computing devices 802-1, 802-2, 802-3, 802-4, which can be configured to operate a client application such as a web browser, a UNIX/Solaris terminal application, and/or the like. In various embodiments, client computing devices 802-1, 802-2, 802-3, 802-4 can correspond to clients 102-1, 102-1 of FIG. 1, and can invoke/interact with virtual directory server 104.

Client computing devices 802-1, 802-2, 802-3, 802-4 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 802-1, 802-2, 802-3, 802-4 can be any other electronic device capable of communicating over a network, such as network 806 described below. Although system environment 800 is shown with four client computing devices, it should be appreciated that any number of client computing devices can be supported.

System environment 800 can further include a network 806. Network 806 can be any type of network familiar to those skilled in the art that can support data communications using a network protocol, such as TCP/IP, SNA, IPX, AppleTalk, and the like. Merely by way of example, network 806 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 800 can further include one or more server computers 804-1, 804-2 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Servers 804-1, 804-2 can run an operating system including any of those discussed above, as well as any commercially available server operating system. Servers 804-1, 804-2 can also run any of a variety of server applications and/or mid-tier applications, including web servers, FTP servers, CGI servers, Java virtual machines, and the like. In one set of embodiments, server 804-1, 804-2 can run a virtual directory server application such as virtual directory server 104, and or a directory server application such as directory servers 106-1, 106-2, 106-3 of FIG. 1.

System environment 800 can further include one or more databases 808. In one set of embodiments, databases 808 can be configured to store any information that is used or accessed by server computers 804-1, 804-2 and/or client computing devices 802-1, 802-2, 802-3, 802-4. Databases 808 can reside in a variety of locations. By way of example, databases 808 can reside on a storage medium local to (and/or resident in) one or more of computers 802-1, 802-2, 802-3, 802-4, 804-1, 804-2. Alternatively, databases 808 can be remote from any or all of computers 802-1, 802-2, 802-3, 802-4, 804-1, 804-2, and/or in communication (e.g., via network 806) with one or more of these. In one set of embodiments, databases 808 can reside in a storage-area network (SAN) familiar to those skilled in the art.

Figure 9:
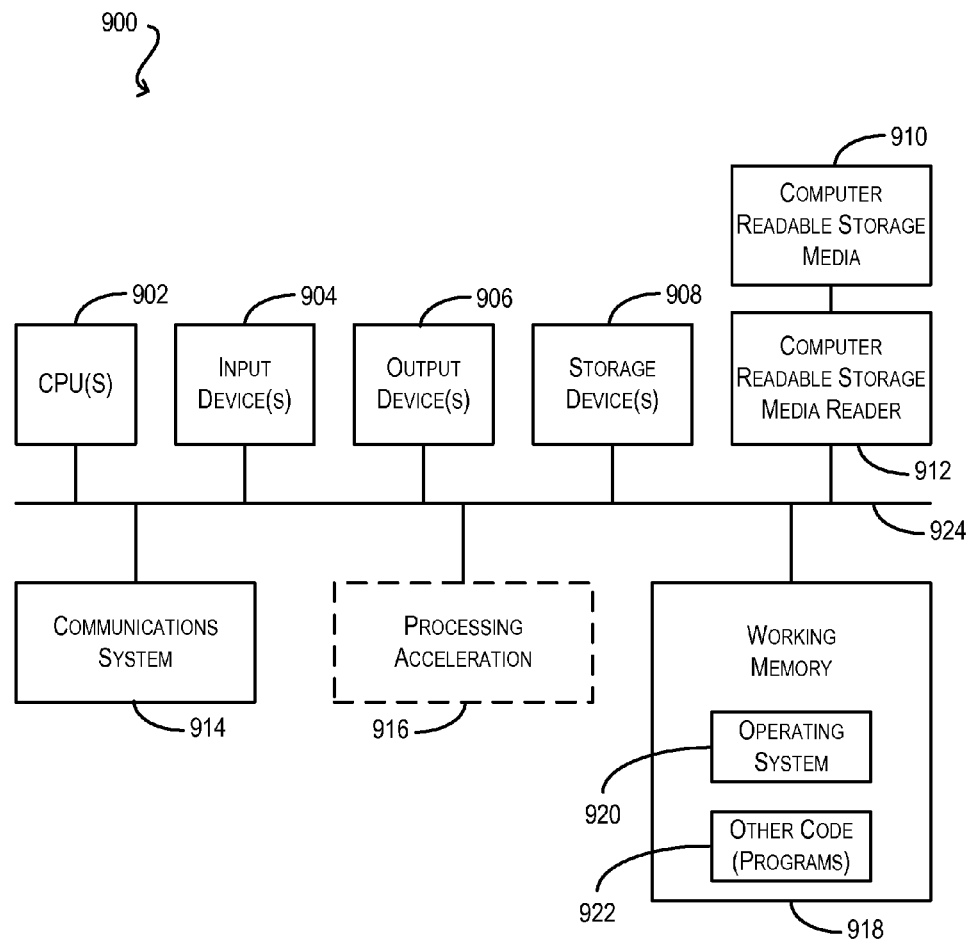
FIG. 9 is a simplified block diagram of a computer system in accordance with an embodiment of the present invention.

FIG. 9 is a simplified block diagram illustrating a computer system 900 that can be used in accordance with an embodiment of the present invention. In various embodiments, computer system 900 can be used to implement any of computers 802-1, 802-2, 802-3, 802-4, 804-1, 804-2 described with respect to system environment 800 above. As shown, computer system 900 can include hardware elements that are electrically coupled via a bus 924. The hardware elements can include one or more central processing units (CPUs) 902, one or more input devices 904 (e.g., a mouse, a keyboard, etc.), and one or more output devices 906 (e.g., a display device, a printer, etc.). Computer system 900 can also include one or more storage devices 908. By way of example, the storage device(s) 908 can include devices such as disk drives, optical storage devices, and solid-state storage devices such as a random access memory (RAM) and/or a read-only memory (ROM), which can be programmable, flash-updateable and/or the like.

Computer system 900 can additionally include a computer-readable storage media reader 912, a communications subsystem 914 (e.g., a modem, a network card (wireless or wired), an infra-red communication device, etc.), and working memory 918, which can include RAM and ROM devices as described above. In some embodiments, computer system 900 can also include a processing acceleration unit 916, which can include a digital signal processor (DSP), a special-purpose processor, and/or the like.

Computer-readable storage media reader 912 can be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 can permit data to be exchanged with network 806 and/or any other computer described above with respect to system environment 800.

Computer system 900 can also comprise software elements, shown as being currently located within working memory 918, including an operating system 920 and/or other code 922, such as an application program (which may be a client application, Web browser, middle tier/server application, etc.). It should be appreciated that alternative embodiments of computer system 900 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 900 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, although embodiments of the present invention have been described with respect to certain flow diagrams and steps, it should be apparent to those skilled in the art that the scope of the present invention is not limited to the described diagrams/steps.

Further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
receiving, by a computer system, a plurality of changelog records from a plurality of directory servers, each changelog record identifying a change to a base directory entry maintained by the directory server from which the changelog record is received, and each changelog record being formatted according to a proprietary changelog format associated with the directory server from which the changelog record is received,
each directory server being associated with a different proprietary changelog format, wherein the plurality of changelog records comprises:
a first changelog record formatted according to a first proprietary changelog format and comprising a first changelog attribute; and
a second changelog record formatted according to a second proprietary changelog format and comprising a second changelog attribute that is different from the first changelog attribute;
virtualizing, by the computer system, the plurality of changelog records into virtualized changelog records such that the virtualized changelog records are formatted according a standard changelog format, wherein each virtualized changelog record includes a change type attribute identifying a type of change made to the base directory entry, and an entry identification attribute identifying the base directory entry, wherein the virtualizing the plurality of changelog records comprises:
mapping the first changelog attribute to the standard changelog format for a corresponding attribute; and
mapping the second changelog attribute to the standard changelog format for the corresponding attribute;
consequent to determining that the base directory entry is a shadow entry and determining that the change type attribute identifies the type of change as a modify or add attribute operation;
determining a primary entry associated with the shadow entry; and
mapping the entry identification attribute to a distinguished name of the primary entry;
returning, by the computer system, the virtualized changelog records.

2. The method of claim 1, wherein each virtualized changelog record further includes:
a first attribute representing an identifier of the virtualized changelog record that is unique to the directory server from which the changelog record is received; and
a second attribute identifying all of the changes made to the base directory entry.

3. The method of claim 2, wherein each directory server is associated with a changelog adapter executing on the computer system, and wherein the virtualizing of changelog records received from the directory server is performed by the changelog adapter.

4. The method of claim 3, wherein the virtualizing the plurality of changelog records further comprises, for each changelog record:
adding a new attribute to the virtualized changelog record, the new attribute reflecting a name of the changelog adapter.

5. The method of claim 3, wherein the virtualizing the plurality of changelog records further comprises, for each changelog record:
determining whether the base directory entry is a standalone entry or a shadow entry; and
if the base directory entry is a standalone entry, mapping the fourth entry identification attribute of the virtualized changelog record to a distinguished name of the standalone entry.

6. The method of claim 5, wherein the determining the primary entry associated with the shadow entry comprises:
determining a base adapter associated with the changelog adapter, the base adapter being configured to join the primary entry with the shadow entry to present a single directory entry to a client requesting the primary entry; and
determining the distinguished name of the primary entry from the base adapter.

7. The method of claim 1, wherein:
if a first directory server in the plurality of directory servers is an Active Directory server, changelog records received from the Active Directory server correspond to base directory entries with a uSNChanged attribute; and
virtualizing a changelog record received from the Active Directory server comprises mapping the value of the uSNChanged attribute to a first attribute in the virtualized changelog record.

8. The method of claim 7, wherein virtualizing a changelog record received from the Active Directory server further comprises including all of the attributes in the base directory entry within a third attribute in the virtualized changelog record.

9. A non-transitory computer readable medium having stored thereon program code executable by a processor, the program code comprising:
code that causes the processor to receive a plurality of changelog records from a plurality of directory servers, each changelog record identifying a change to a base directory entry maintained by the directory server from which the changelog record is received, and each changelog record being formatted according to a proprietary changelog format associated with the directory server from which the changelog record is received, each directory server being associated with a different proprietary changelog format, wherein the plurality of changelog records comprises:
a first changelog record formatted according to a first proprietary changelog format and comprising a first changelog attribute; and
a second changelog record formatted according to a second proprietary changelog format and comprising a second changelog attribute that is different from the first changelog attribute;
code that causes the processor to virtualize the plurality of changelog records into virtualized changelog records such that the virtualized changelog records are formatted according a standard changelog format, wherein each virtualized changelog record includes a change type attribute identifying a type of change made to the base directory entry, and an entry identification attribute identifying the base directory entry, wherein the virtualizing the plurality of changelog records comprises:
mapping the first changelog attribute to the standard changelog format for a corresponding attribute; and
mapping the second changelog attribute to the standard changelog format for the corresponding attribute;

consequent to determining that the base directory entry is a shadow entry and determining that the change type attribute identifies the type of change as a modify or add attribute operation;

determining a primary entry associated with the shadow entry; and mapping the entry identification attribute to a distinguished name of the primary entry;

code that causes the processor to return the virtualized changelog records.

10. The non-transitory computer readable medium of claim 9, wherein each virtualized changelog record includes:

a first attribute representing an identifier of the virtualized changelog record that is unique to the directory server from which the changelog record is received; and a second attribute identifying all of the changes made to the base directory entry.

11. The non-transitory computer readable medium of claim 10, wherein the virtualizing the plurality of changelog records further comprises, for each changelog record:

determining whether the base directory entry is a standalone entry or a shadow entry; and if the base directory entry is a standalone entry, mapping the entry identification attribute of the virtualized changelog record to a distinguished name of the standalone entry.

12. A system comprising:

a processor configured to:

receive a plurality of changelog records from a plurality of directory servers, each changelog record identifying a change to a base directory entry maintained by the directory server from which the changelog record is received, and each changelog record being formatted according to a proprietary changelog format associated with the directory server from which the changelog record is received, each directory server being associated with a different proprietary changelog format, wherein the plurality of changelog records comprises:

a first changelog record formatted according to a first proprietary changelog format and comprising a first changelog attribute; and a second changelog record formatted according to a second proprietary changelog format and comprising a second changelog attribute that is different from the first changelog attribute;

virtualize the plurality of changelog records into virtualized changelog records such that the virtualized changelog records are formatted according a standard changelog format, wherein each virtualized changelog record includes a change type attribute identifying a type of change made to the base directory entry, and an entry identification attribute identifying the base directory entry, wherein the virtualizing the plurality of changelog records comprises:

mapping the first changelog attribute to the standard changelog format for a corresponding attribute; and mapping the second changelog attribute to the standard changelog format for the corresponding attribute;

consequent to determining that the base directory entry is a shadow entry and determining that the change type attribute identifies the type of change as a modify or add attribute operation;

determining a primary entry associated with the shadow entry; and mapping the entry identification attribute to a distinguished name of the primary entry;

return the virtualized changelog records.

13. The system of claim 12, wherein each virtualized changelog record includes:

a first attribute representing an identifier of the virtualized changelog record that is unique to the directory server from which the changelog record is received; and a second attribute identifying all of the changes made to the base directory entry.

14. The system of claim 13, wherein the virtualizing the plurality of changelog records further comprises, for each changelog record:

determining whether the base directory entry is a standalone entry or a shadow entry; and if the base directory entry is a standalone entry, mapping the entry identification attribute of the virtualized changelog record to a distinguished name of the standalone entry.

* * * * *

UNITED STATES PATENT AND TRADEMARK OFFICE
CERTIFICATE OF CORRECTION

PATENT NO. : 8,745,072 B2
APPLICATION NO. : 13/216057
DATED : June 3, 2014
INVENTOR(S) : Sharma et al.

Page 1 of 1

It is certified that error appears in the above-identified patent and that said Letters Patent is hereby corrected as shown below:

In The Specification

In column 15, line 47, delete "and or" and insert -- and/or --, therefor.

Signed and Sealed this
Twenty-seventh Day of January, 2015

Michelle K. Lee
*Deputy Director of the United States Patent and Trademark Office*